(12) United States Patent
Niglas et al.

(10) Patent No.: US 10,543,826 B2
(45) Date of Patent: Jan. 28, 2020

(54) VALVE SYSTEM AND METHOD FOR CONTROLLING SAME

(71) Applicant: Bendix Commercial Vehicle Systems LLC, Elyria, OH (US)

(72) Inventors: Paul C. Niglas, Avon, OH (US); Michael D. Tober, Avon, OH (US); Randy J. Salvatora, North Olmsted, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 1 day.

(21) Appl. No.: 15/470,219

(22) Filed: Mar. 27, 2017

(65) Prior Publication Data
US 2018/0273013 A1 Sep. 27, 2018

(51) Int. Cl.
*B60T 15/18* (2006.01)
*B60T 7/20* (2006.01)
(Continued)

(52) U.S. Cl.
CPC .............. *B60T 15/18* (2013.01); *B60T 7/042* (2013.01); *B60T 7/085* (2013.01); *B60T 7/20* (2013.01); *B60T 8/1708* (2013.01); *B60T 8/38* (2013.01); *B60T 8/88* (2013.01); *B60T 8/885* (2013.01); *B60T 13/263* (2013.01);
(Continued)

(58) Field of Classification Search
CPC .......... B60T 15/18; B60T 7/20; B60T 8/1708; B60T 13/683; B60T 2201/06
See application file for complete search history.

(56) References Cited

U.S. PATENT DOCUMENTS 4,054,327 A 10/1977 Rebenstorf
4,112,961 A 9/1978 Horowitz
(Continued)

FOREIGN PATENT DOCUMENTS

CA 2000767 A1 4/1990
CN 102991493 A 3/2013
(Continued)

OTHER PUBLICATIONS

International Search Report for counterpart International Application No. PCT/US2018/024533, 7 pages, dated Jul. 13, 2018.
(Continued)

*Primary Examiner* — Melanie Torres Williams
(74) *Attorney, Agent, or Firm* — Brian E. Kondas (57) ABSTRACT

A valve system includes an isolation check valve delivering pneumatic fluid as a supply pressure, a double-check valve adapted to deliver a braking demand control signal of the pneumatic fluid based on a higher of a first braking demand in a first pneumatic braking circuit and a second braking demand in a second pneumatic braking circuit, and a control module. The control module is adapted to receive the supply pressure as a control module supply pressure of the pneumatic fluid, receive a control module control pressure of the pneumatic fluid based on the braking demand control signal, and deliver a control module delivery pressure of the pneumatic fluid based on the control module supply pressure and the control module control pressure. A park control module selectively transmits the pneumatic fluid at the supply pressure based on a park brake control signal.

30 Claims, 5 Drawing Sheets

(51) Int. Cl.
*B60T 8/17* (2006.01)
*B60T 13/68* (2006.01)
*B60T 7/04* (2006.01)
*B60T 7/08* (2006.01)
*B60T 8/38* (2006.01)
*B60T 8/88* (2006.01)
*B60T 13/26* (2006.01)
*B60T 13/66* (2006.01)
*B60T 13/74* (2006.01)
*B60T 15/20* (2006.01)
*B60T 15/22* (2006.01)
*B60T 17/22* (2006.01)

(52) U.S. Cl.
CPC ............ *B60T 13/265* (2013.01); *B60T 13/66* (2013.01); *B60T 13/662* (2013.01); *B60T 13/68* (2013.01); *B60T 13/683* (2013.01); *B60T 13/74* (2013.01); *B60T 15/181* (2013.01); *B60T 15/182* (2013.01); *B60T 15/203* (2013.01); *B60T 15/206* (2013.01); *B60T 15/223* (2013.01); *B60T 15/226* (2013.01); *B60T 17/221* (2013.01); *B60T 2201/06* (2013.01)

(56) References Cited

U.S. PATENT DOCUMENTS

| | | | |
|---|---|---|---|
| 5,061,015 | A | 10/1991 | Cramer et al. |
| 5,492,204 | A | 2/1996 | Wallace |
| 6,785,980 | B1 | 9/2004 | Koelzer |
| 6,858,066 | B2 | 2/2005 | Quinn et al. |
| 6,971,404 | B2 | 12/2005 | Simmons, Jr. |
| 8,282,173 | B2 | 10/2012 | Förster et al. |
| 8,297,713 | B2 | 10/2012 | Soupal |
| 2011/0193407 | A1 | 8/2011 | Wohltmann et al. |
| 2017/0072930 | A1* | 3/2017 | Leinung ................ B60T 13/683 |
| 2017/0313293 | A1* | 11/2017 | Bjornelund ........... B60T 13/261 |

FOREIGN PATENT DOCUMENTS

| | | |
|---|---|---|
| DE | 102007016335 A1 | 10/2008 |
| DE | 102008009882 A1 | 8/2009 |
| EP | 0586203 B1 | 3/1994 |
| EP | 1504975 A1 | 2/2005 |
| EP | 2572950 A2 | 3/2013 |
| EP | 2821303 A1 | 1/2015 |
| EP | 2998177 A1 | 3/2016 |
| EP | 3112230 A1 | 1/2017 |
| GB | 1563524 A | 3/1980 |
| GB | 2284458 A | 6/1995 |
| WO | 2014009457 A1 | 1/2014 |
| WO | 2014063720 A1 | 5/2014 |
| WO | 2016169973 A1 | 10/2016 |
| WO | 2016169975 A1 | 10/2016 |

OTHER PUBLICATIONS

Written Opinion for counterpart International Application No. PCT/US2018/024533, 9 pages, dated Jul. 13, 2018.

* cited by examiner

FIG. 5

VALVE SYSTEM AND METHOD FOR CONTROLLING SAME

BACKGROUND

The present invention relates to a tractor protection function. It finds particular application in conjunction with delivering pneumatic fluid from a tractor to a trailer based on a trailer park brake pressure and will be described with particular reference thereto. It will be appreciated, however, that the invention is also amenable to other applications.

Current trailer control strategies involve using a relay valve to apply full system air pressure to a supply port of an antilock braking system (ABS) modulator. The ABS modulator is set to hold off pressure, and pulses to send a set volume of air into the trailer control line to apply trailer brakes. There is no mechanism to compensate for any loss of air volume in the trailer and/or verify that the required air pressure has been delivered to the trailer.

The present invention provides a new and improved apparatus and method for compensating for any loss of air volume in the trailer and/or verifying that the required air pressure has been delivered to the trailer.

SUMMARY

In one aspect of the present invention, it is contemplated that a valve system includes an isolation check valve delivering pneumatic fluid as a supply pressure, a double-check valve adapted to deliver a braking demand control signal of the pneumatic fluid based on a higher of a first braking demand in a first pneumatic braking circuit and a second braking demand in a second pneumatic braking circuit, and a control module. The control module is adapted to receive the supply pressure as a control module supply pressure of the pneumatic fluid, receive a control module control pressure of the pneumatic fluid based on the braking demand control signal, and deliver a control module delivery pressure of the pneumatic fluid based on the control module supply pressure and the control module control pressure. A park control module selectively transmits the pneumatic fluid at the supply pressure based on a park brake control signal.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
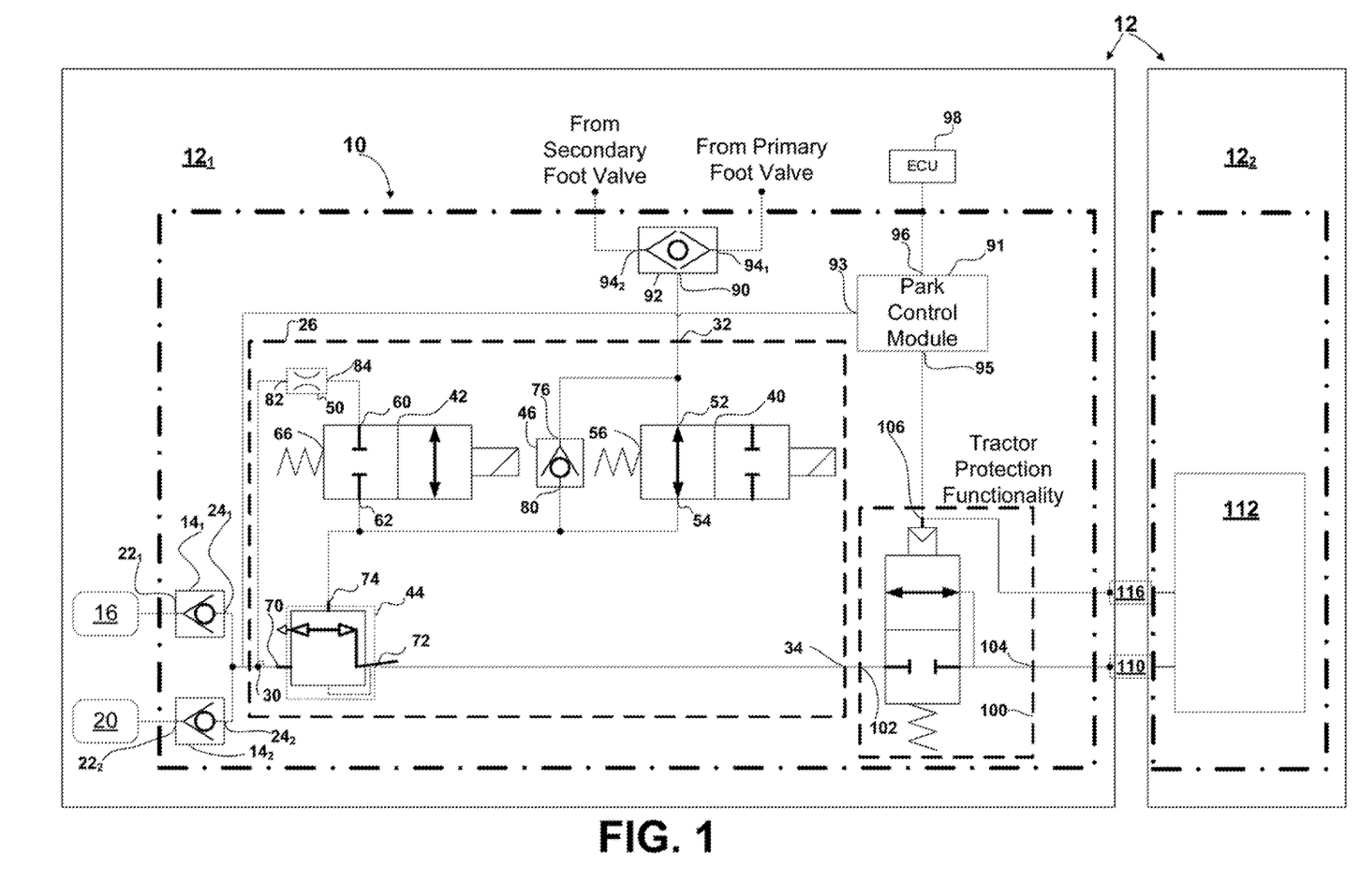
FIG. 1 illustrates a schematic representation of a simplified component diagram of an exemplary valve system in a first state while an associated vehicle is in a first state in accordance with one embodiment of an apparatus illustrating principles of the present invention.

With reference to FIG. 1, a simplified component diagram of an exemplary valve system 10 is illustrated in accordance with one embodiment of the present invention. The valve system 10 is part of an associated combination vehicle 12, which includes a tractor 12$_1$ and a trailer 12$_2$, and includes at least one isolation check valve 14$_1$, 14$_2$ (e.g., two (2) check valves collectively referenced as 14). The first isolation check valve 14$_1$ receives a pneumatic fluid (e.g., air) from a first source such as, for example, a first reservoir 16, and the second isolation check valve 14$_2$ receives the pneumatic fluid from a second source such as, for example, a second reservoir 20. It is to be assumed that the first and second reservoirs 16, 20 are part of respective fluidly independent pneumatic circuits. The first isolation check valve 14$_1$ includes a first pneumatic supply port 22$_1$ and a first pneumatic delivery port 24$_1$. The second isolation check valve 14$_2$ includes a second pneumatic supply port 22$_2$ and a second pneumatic delivery port 24$_2$. The first pneumatic delivery port 24$_1$ fluidly communicates with the second pneumatic delivery port 24$_2$. A higher of the respective pressures (e.g., supply pressures) of the pneumatic fluid at the first and second pneumatic supply ports 22$_{1,2}$ is present at both the first and second pneumatic delivery ports 24$_{1,2}$.

A control module 26 includes a supply port 30, a control port 32, and a delivery port 34. The control module 26 also includes a first control valve 40, a second control valve 42, a relay valve 44, a control module check valve 46, and a restrictor 50. The first control valve 40 includes a supply port 52 (e.g., a pneumatic supply port), a delivery port 54 (e.g., a pneumatic delivery port) and a control port 56 (e.g., an electrical control port). The second control valve 42 includes a supply port 60 (e.g., a pneumatic supply port), a delivery port 62 (e.g., a pneumatic delivery port) and a control port 66 (e.g., an electrical control port). The relay valve 44 includes a supply port 70 (e.g., a pneumatic supply (input) port), a delivery port 72 (e.g., a pneumatic delivery (output) port), and a control port 74 (e.g., a pneumatic control port). The check valve 46 includes a pneumatic supply port 76 (e.g., input port) and a pneumatic delivery port 80 (e.g., output port). The restrictor 50 includes an pneumatic supply port 82 (e.g., input port) and a pneumatic delivery port 84 (e.g., output port).

In the illustrated embodiment, both the relay valve supply port 70 and the restrictor input port 82 fluidly communicate with the control module supply port 30. Both the first control valve supply port 52 and the check valve supply port 76 fluidly communicate with the control module control port 32. Each of the first control valve delivery port 54, the second control valve delivery port 62 and the check valve delivery port 80 fluidly communicates with relay valve control port 74. The check valve 46 opens to permit fluid communication between the check valve supply port 76 and the check valve delivery port 80 when a pressure of the pneumatic fluid at the check valve supply port 76 is greater than a pressure at the check valve delivery port 80 by a predetermined amount; otherwise, the check valve 46 remains closed to prevent fluid communication between the check valve supply port 76 and the check valve delivery port 80. The relay valve delivery port 72 fluidly communicates with the control module delivery port 34.

The higher of the respective supply pressures of the pneumatic fluid at the first and second pneumatic supply ports $22_{1,2}$, which is present at both the first and second pneumatic delivery ports $24_{1,2}$, is fluidly communicated to the control module supply port 30 as a control module supply pressure. The control module supply pressure is, therefore, fluidly communicated to the restrictor input port 82 and the relay valve supply port 70. The restrictor output port 84 fluidly communicates the control module supply pressure to the second control valve supply port 60. The restrictor 50 slows airflow from the first and second reservoirs 16, 20 to help control the second control valve 42. In addition, the restrictor 50 allows a leak from the supply port 60 to the control port 62 of the second control valve 42 to exhaust through the delivery port 54 of the first control valve 40 before such a leak acts on the control port 74 of the relay valve 44.

The control module control port 32 receives a pneumatic control signal, based on a level of operator demanded braking, from an output port 90 of a double check valve 92. For example, the operator of an associated combination vehicle 12 depresses a pedal of a foot valve (not shown) to demand braking. The level of the operator demanded braking is dependent on an amount the pedal is depressed. The pneumatic fluid from the first and second reservoirs 16, 20 is fluidly transmitted to respective first and second input ports $94_1$, $94_2$ of the double check valve 92 based on the level of operator demanded braking. The higher of the respective pneumatic pressures at the first and second input ports $92_1$, $92_2$ is fluidly communicated to the double check valve output port 90 and, therefore, to the control module control port 32. The higher of the respective pneumatic pressures at the first and second input ports $92_1$, $92_2$ is also fluidly communicated from the control module control port 32 to both the first control valve supply port 52 and the check valve supply port 76.

A park control module 91 includes a supply port 93, a delivery port 95, and a control port 96. In one embodiment, the park control module supply port 93 and the park control module delivery port 95 are pneumatic ports, and the park control module control port 96 is an electronic port. However, any combination of pneumatic and electronic ports are contemplated for the park control module supply port 93, the park control module delivery port 95 and the park control module control port 96. The park control module supply port 93 fluidly communicates with both the control module supply port 30 and the relay valve supply port 70. Therefore, the pneumatic pressure at the park control module supply port 93 is substantially equal to the pneumatic pressure at both the control module supply port 30 and the relay valve supply port 70. The park control module control port 96 electrically communicates with an electronic control unit 98.

The ECU 98 electrically transmits an electronic control signal to the park control module control port 96 based on a desired status of the park brakes (not shown) of the trailer $12_2$. For example, the ECU 98 receives a command (e.g., an electrical command) from an operator of the combination vehicle 12 to either engage the park brakes of the trailer $12_2$ (e.g., set the trailer $12_2$ to the parked state) or disengage the park brakes of the trailer $12_2$ (e.g., set the trailer $12_2$ to the unparked state). If the park brakes of the trailer $12_2$ are not desired to be engaged, the ECU 98 electrically transmits a first electronic control signal to the park control module control port 96; and if the park brakes of the trailer $12_2$ are desired to be engaged, the ECU 98 electrically transmits a second electronic control signal to the park control module control port 96. It is contemplated, in one embodiment, that the first electronic signal is the absence of an electric signal (e.g., an electric signal less than a predetermined voltage), and the second electronic signal is the presence of an electric signal (e.g., an electric signal at least the predetermined voltage). In one embodiment, the predetermined voltage is about 2.5 Volts.

The park control module supply port 93 selectively fluidly communicates with the park control module delivery port 95 based on the electronic control signal at the park control module control port 96 (e.g., a park brake control signal). For example, if the park brakes of the trailer $12_2$ are desired to be engaged (e.g., if the associated combination vehicle 12 is desired to be in a parked state), the first electronic signal is transmitted from the ECU 98 to the park control module control port 96 and the park control module supply port 93 is selected to not fluidly communicate with the park control module delivery port 95. Otherwise, if the park brakes of the trailer $12_2$ are desired to not be engaged (e.g., if the associated combination vehicle 12 is desired to be in an unparked state), the second electronic signal is transmitted from the ECU 98 to the park control module control port 96 and the park control module supply port 93 is selected to fluidly communicate with the park control module delivery port 95.

Figure 2:
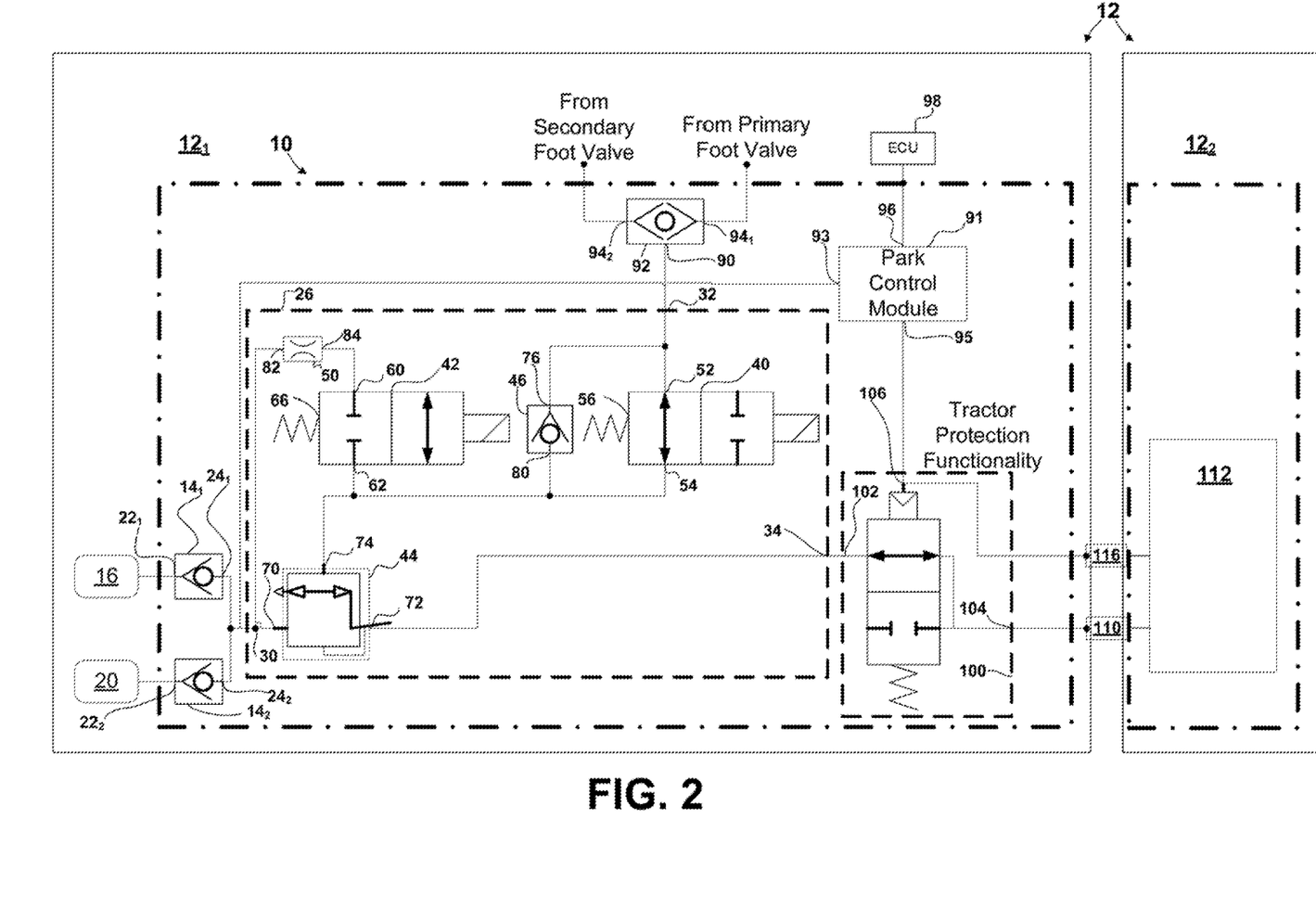
FIG. 2 illustrates a schematic representation of a simplified component diagram of an exemplary valve system in the first state while the associated vehicle is in a second state in accordance with one embodiment of an apparatus illustrating principles of the present invention.

A tractor protection module 100 includes a supply port 102 (e.g., input), a delivery port 104 (e.g., output) and a control port 106. The tractor protection supply port 102 fluidly communicates with the tractor protection delivery port 104 based on a pneumatic pressure at the tractor protection control port 106. In the illustrated embodiment, the tractor protection control port 106 fluidly communicates with the park control module delivery port 95. The pneumatic pressure at the tractor protection control port 106 is referred to as a trailer park brake pneumatic pressure. The trailer park brake pneumatic pressure at the tractor protection control port 106 (e.g., trailer park brake pressure) is at least a predetermined threshold if the associated combination vehicle 12 is in an unparked state (see FIG. 2) and below the predetermined threshold if the associated combination vehicle 12 is in a parked state (see FIG. 1). While the trailer $12_2$ is in the unparked state (see FIG. 2), the tractor protection supply port 102 fluidly communicates with the tractor protection delivery port 104 so that the pneumatic pressure at the tractor protection supply port 102 is fluidly communicated to the tractor protection delivery port 104, during which time the tractor protection module is also in an unparked state. While the trailer $12_2$ is in the parked state, as illustrated in FIG. 1, the tractor protection supply port 102 does not fluidly communicate with the tractor protection delivery port 104, during which time the tractor protection module is also in an parked state.

Figure 3:
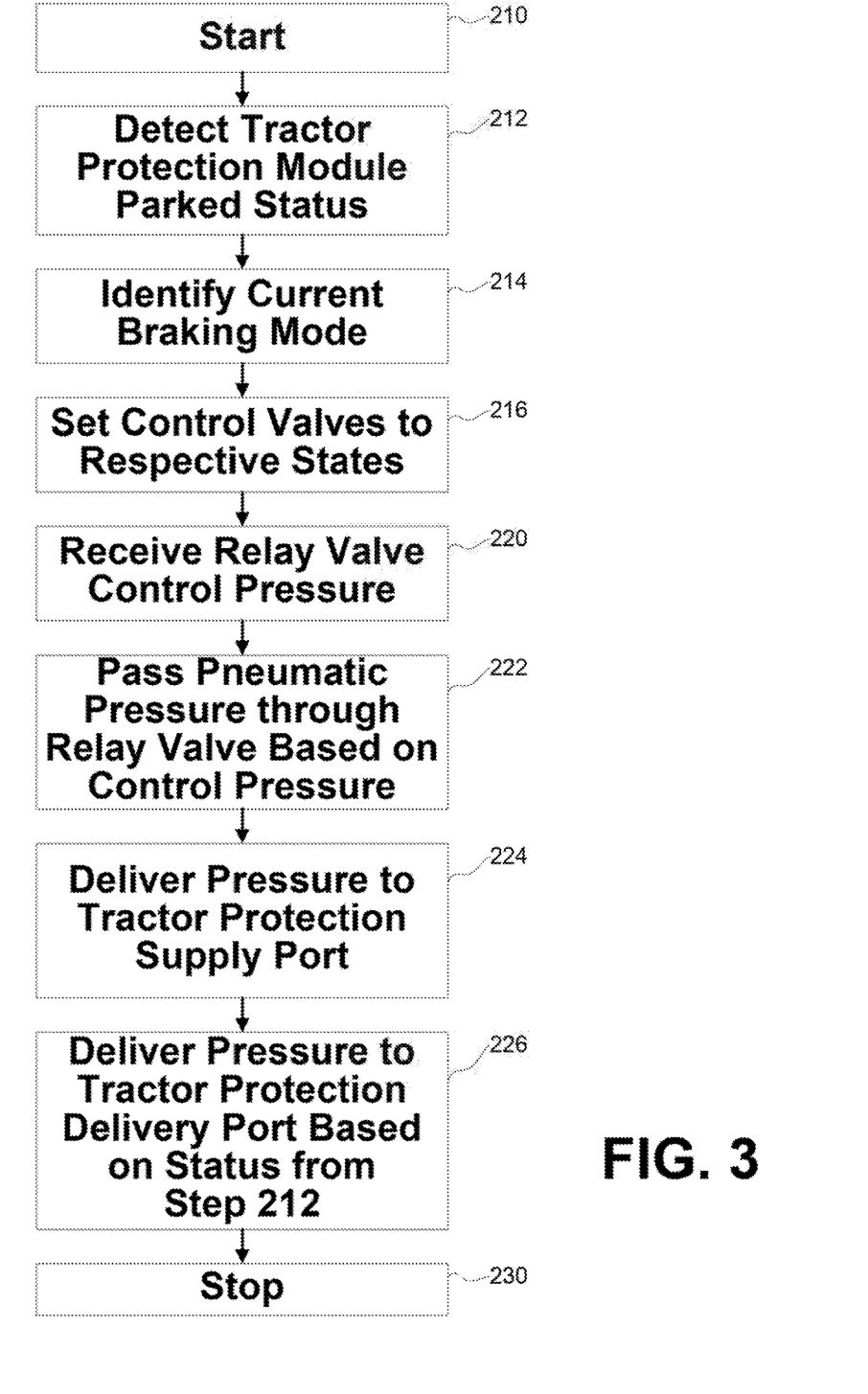
FIG. 3 is an exemplary methodology of controlling the valve system in accordance with one embodiment illustrating principles of the present invention.
Figure 4:
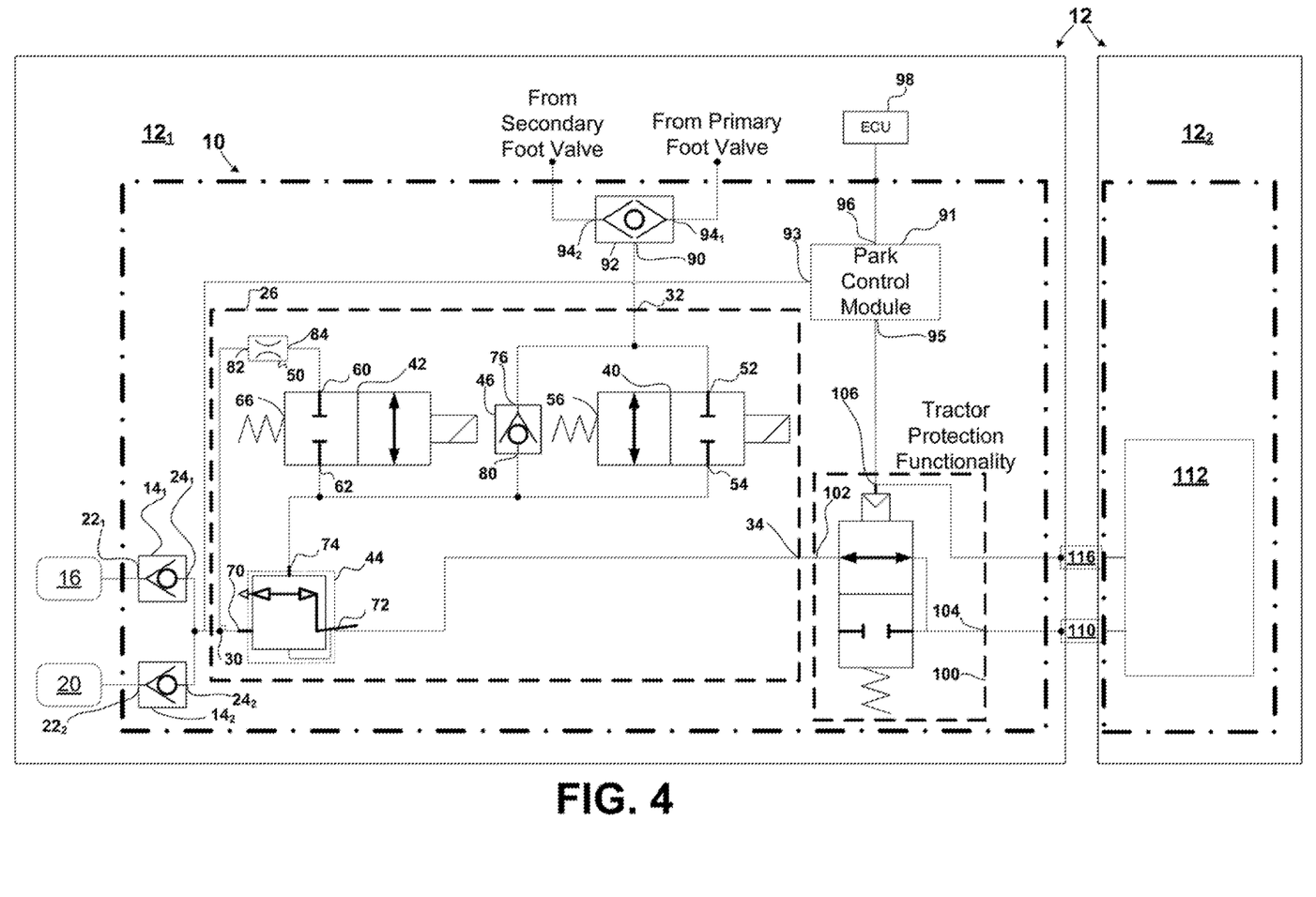
FIG. 4 illustrates a schematic representation of a simplified component diagram of an exemplary valve system in a second state while the associated vehicle is in the second state in accordance with one embodiment of an apparatus illustrating principles of the present invention.
Figure 5:
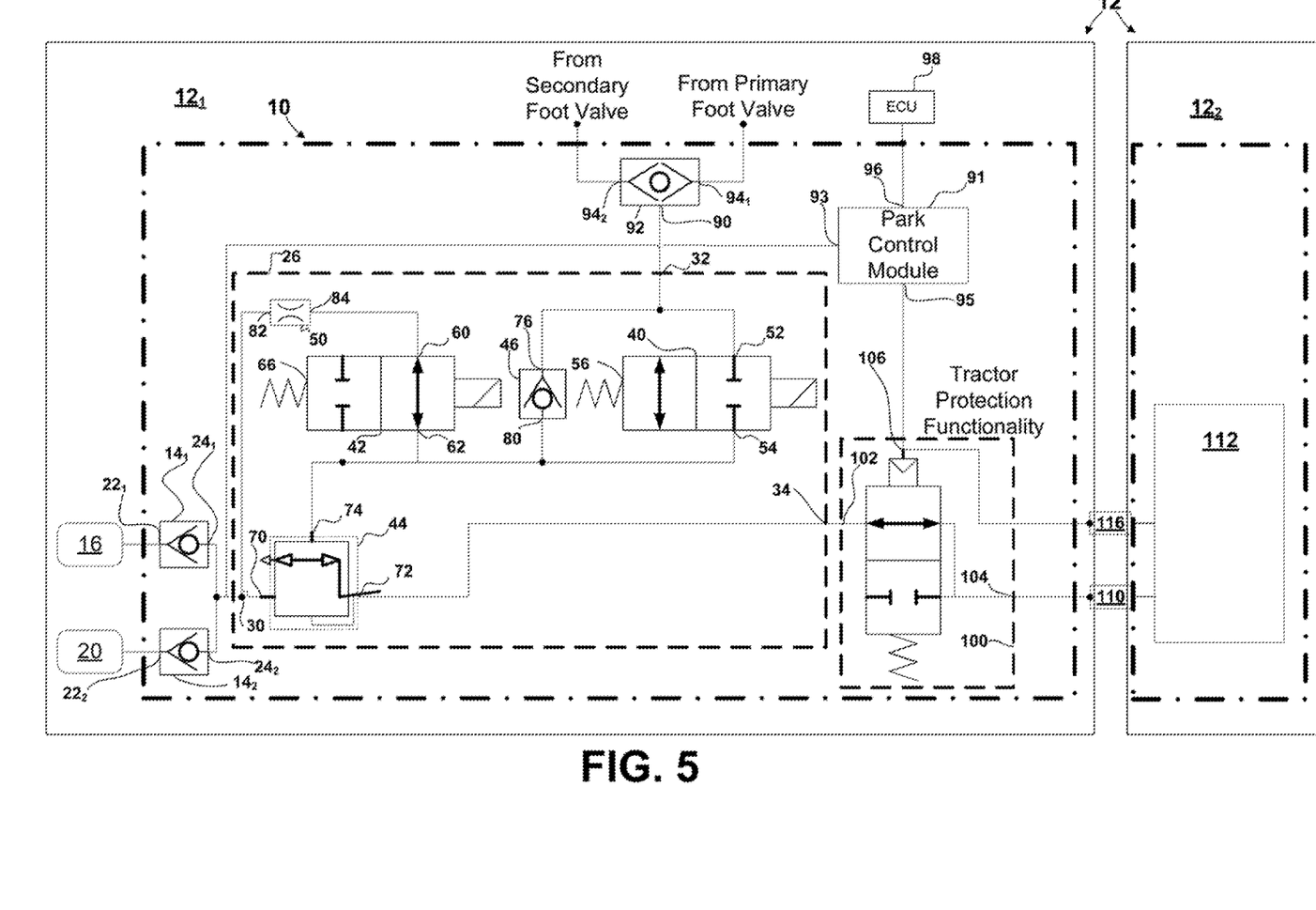
FIG. 5 illustrates a schematic representation of a simplified component diagram of an exemplary valve system in a third state while the associated vehicle is in the second state in accordance with one embodiment of an apparatus illustrating principles of the present invention.

With reference to FIG. 3, an exemplary methodology of the operation of the valve system 10 shown in FIGS. 1, 2, 4 and 5 is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1-5, the operation starts in a step 210. Then, in a step 212, the status of the tractor protection module 100 is detected. For example, the status of the park brakes (not shown) of the trailer $12_2$ is set in the step 212 as either "unparked" or "parked." More specifically, the ECU 98 electrically transmits the electronic control signal to the park control module control port 96 based on the desired status of the park brakes of the trailer $12_2$, and the park control module 91 receives the electronic control signal. In a step 214, a current braking mode is determined. For example, one of the following three (3) current braking modes is identified in the step 214: an operator initiated braking mode (see FIGS. 1 and 2), a system increasing pressure mode (see FIG. 5), and a system holding pressure mode (see FIG. 4). During the operator initiated braking mode (see FIGS. 1 and 2), the amount of braking of the associated combination vehicle 12 is based on how much the operator depresses the pedal of the foot valve. During the system increasing pressure mode (see FIG. 5), the amount of braking of the associated combination vehicle 12 is being increased by an automatic braking system (e.g., antilock braking system (ABS), electronic braking system (EBS), etc). During the system holding pressure mode (see FIG. 4), the amount of braking of the associated combination vehicle 12 is being held by the automatic braking system (e.g., antilock braking system (ABS), electronic braking system (EBS), etc).

Then, in a step 216, the first and second control valves 40, 42, respectively, are set to respective states based on the current braking mode. For example, if the current braking mode is the operator initiated braking mode (see FIGS. 1 and 2), then in the step 216 the first control valve 40 is set to an open state and the second control valve 42 is set to a closed state. If the current braking mode is the system increasing pressure mode (see FIG. 5), then in the step 216 the first control valve 40 is set to a closed state and the second control valve 42 is set to an open state. If the current braking mode is the system holding pressure mode (see FIG. 4), then in the step 216 both the first and second control valves 40, 42, respectively, are set to the closed state.

While in the open state, the first control valve 40 is set so that the first control valve supply port 52 fluidly communicates with the first control valve delivery port 54. Similarly, while in the open state, the second control valve 42 is set so that the second control valve supply port 60 fluidly communicates with the second control valve delivery port 62. While in the closed state, the first control valve 40 is set so that the first control valve supply port 52 does not fluidly communicate with the first control valve delivery port 54. Similarly, while in the closed state, the second control valve 42 is set so that the second control valve supply port 60 does not fluidly communicate with the second control valve delivery port 62.

In a step 220, the relay valve control port 74 receives a relay valve control pressure from at least one of the first control valve 40, the second control valve 42 and the check valve 46. For example, if the first control valve 40 is set to the open state and the second control valve 42 is set to a closed state (e.g., if the current braking mode is the operator initiated braking mode), the relay valve control pressure is received from the first control valve 40 and represents the level of operator demanded braking. If the first control valve 40 is set to the closed state and the second control valve 42 is set to a open state (e.g., if the current braking mode is the system increasing pressure braking mode), the relay valve control pressure is received from the second control valve 42 and represents the level of system demanded braking. If both the first control valve 40 is set to the closed state and the second control valve 42 is set to a closed state (e.g., if the current braking mode is the system holding pressure braking mode), the relay valve control pressure is received from the check valve 46 and represents the level of system demanded braking during, for example, a hill start assist, which maintains brakes while stopped on a grade until the operator actuates an accelerator of the associated combination vehicle 12.

In a step 222, the relay valve 44 passes the pneumatic pressure at the control module supply port 30 to the control module delivery port 80 based on the pneumatic pressure received at the relay valve control port 74.

In another embodiment, the pneumatic pressure passed from the control module supply port 30 to the control module delivery port 80 changes (e.g., proportionally) as the pneumatic pressure at the relay valve control port 74 changes. For example, the pneumatic pressure delivered from the control module supply port 30 to the control module delivery port 80 changes (e.g., proportionally) as the pneumatic pressure at relay valve control port 74 increases or decreases. It is also contemplated that the pneumatic pressure delivered from the control module supply port 30 to the control module delivery port 80 changes linearly as the pneumatic pressure at relay valve control port 74 increases or decreases.

In a step 224, the pneumatic pressure at the relay valve delivery port 72 is delivered to the control module delivery port 34 and, consequently, the tractor protection module supply port 102.

Then, in a step 226, the pneumatic pressure at the tractor protection module supply port 102 is delivered to the tractor protection delivery port 104 based on the status of the tractor protection module 100 detected in the step 212. For example, if the status of the tractor protection module 100 is unparked (see FIG. 2), the pneumatic pressure at the tractor protection delivery port 104 is transmitted, during the step 226, to a control glad-hand 110, which fluidly communicates with a brake system 112 on the trailer $12_2$ of the combination vehicle 12. A supply glad-hand 116 fluidly communicates with brake system 112. The brake system 112 on the trailer $12_2$ is controlled based on the pneumatic pressure delivered from the tractor protection delivery port 104. On the other hand, if the status of the tractor protection module 100 is parked (see FIG. 1), the pneumatic pressure at the tractor protection delivery port 104 is not transmitted to the control glad-hand 110 during the step 226.

The operation stops in a step 230.

In one embodiment, it is contemplated that the at least one isolation check valve 14, the first control valve 40, the second control valve 42, the control module check valve 46, the relay valve 44, the park control module 91 and the tractor protection module 100 act as a means for controlling the pressure at the delivery port 104 of the tractor protection module 100.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A valve system, including:
   an isolation check valve delivering pneumatic fluid as a supply pressure;
   a double-check valve adapted to deliver a braking demand control signal of the pneumatic fluid based on a higher of a first braking demand in a first pneumatic braking circuit and a second braking demand in a second pneumatic braking circuit;
   a control module adapted to:
      receive the supply pressure as a control module supply pressure of the pneumatic fluid;
      receive a control module control pressure of the pneumatic fluid based on the braking demand control signal; and
      deliver a control module delivery pressure of the pneumatic fluid based on the control module supply pressure and the control module control pressure;
   a park control module selectively transmitting the pneumatic fluid at the supply pressure based on a park brake control signal; and
   a tractor protection module delivering the pneumatic fluid at the control module delivery pressure if the park control module is selected to transmit the pneumatic fluid at the supply pressure.

2. The valve system as set forth in claim 1, wherein:
   the park brake control module receives the park brake control signal from an associated electronic control unit.

3. The valve system as set forth in claim 2, wherein:
   the park brake control signal is one of a presence of an electric signal from the associated electronic control unit and an absence of the electric signal.

4. The valve system as set forth in claim 1, wherein the control module includes a relay valve adapted to:
   receive a relay valve supply pressure of the pneumatic fluid based on the control module supply pressure;
   receive a relay valve control pressure of the pneumatic fluid based on one of i) the braking demand control signal and the ii) control module supply pressure; and
   deliver a relay control pressure of the pneumatic fluid, based on the relay valve supply pressure and the relay valve control pressure, as the control module delivery pressure.

5. The valve system as set forth in claim 4, wherein the control module further includes:
   a first control valve set to fluidly communicate the braking demand control signal as the relay valve control pressure based on a current braking mode; and
   a second control valve set to fluidly communicate the control module supply pressure as the relay valve control pressure based on the current braking mode.

6. The valve system as set forth in claim 5, wherein:
   the current braking mode is one of an operator initiated braking mode, a system increasing pressure mode, and a system holding pressure mode;
   the first control valve is set to fluidly communicate the braking demand control signal as the relay valve control pressure, while the second control valve set to not fluidly communicate the control module supply pressure as the relay valve control pressure, if the current braking mode is the operator initiated braking mode;
   the second control valve is set to fluidly communicate the control module supply pressure as the relay valve control pressure, while the first control valve is set to not fluidly communicate the braking demand control signal as the relay valve control pressure, if the current braking mode is the system increasing pressure mode; and
   neither the first control valve is set to fluidly communicate the braking demand control signal as the relay valve control pressure nor the second control valve is set to fluidly communicate the control module supply pressure as the relay valve control pressure if the current braking mode is the system holding pressure mode.

7. The valve system as set forth in claim 6, the control module further including:
   a check valve adapted to fluidly communicate the braking demand control signal as the relay valve control pressure during the system holding pressure mode.

8. The valve system as set forth in claim 7, wherein:
   the system holding pressure mode is active during a hill start assist.

9. The valve system as set forth in claim 6, further including:
   a tractor protection module delivering the pneumatic fluid at the control module delivery pressure when the trailer park brake pressure of the pneumatic fluid is set to an unparked state.

10. The valve system as set forth in claim 1, wherein:
    the isolation check valve is a double-check valve delivering a higher of a first pneumatic reservoir pressure and a second pneumatic reservoir pressure as the supply pressure.

11. The valve system as set forth in claim 1, further including:
    a tractor protection module not delivering the pneumatic fluid at the control module delivery pressure when the trailer park brake pressure of the pneumatic fluid is set to a parked state.

12. A valve system, including:
    a first check valve including a first check valve pneumatic supply port and a first check valve pneumatic delivery port;
    a second check valve including a second check valve pneumatic supply port and a second check valve pneumatic delivery port, the first check valve pneumatic delivery port fluidly communicating with the second check valve pneumatic delivery port and a higher of respective pneumatic supply pressures of a pneumatic fluid at the first and second check valve pneumatic supply ports being fluidly transmitted to the first and second check valve pneumatic delivery ports as a pneumatic supply pressure of the pneumatic fluid;
    a double-check valve delivering a braking demand pneumatic fluid control signal based on a higher of a first braking demand in a first pneumatic braking circuit and a second braking demand in a second pneumatic braking circuit;
    a control module, including:
       a pneumatic supply port fluidly communicating with both the first and second check valve pneumatic delivery ports and fluidly receiving the pneumatic supply pressure of the pneumatic fluid;
       a pneumatic control port receiving the braking demand pneumatic fluid control signal; and
       a pneumatic delivery port delivering a pneumatic fluid at a delivery pressure based on the braking demand pneumatic fluid control signal;
    a park control module selectively transmitting the pneumatic fluid at the supply pressure based on a park brake control signal; and a tractor protection valve including a tractor protection valve input port, fluidly communicating with the control module pneumatic delivery port, and a tractor protection valve output port, the pneumatic fluid at the delivery pressure from the control module pneumatic delivery port being delivered from the tractor protection valve input port to the tractor protection output port based on a state of the tractor protection valve.

13. The valve system as set forth in claim 12, wherein: the park brake control module receives the park brake control signal as an electronic control signal from an associated electronic control unit.

14. The valve system as set forth in claim 13, wherein: the park brake control signal is one of a presence of an electric signal from the associated electronic control unit and an absence of the electric signal.

15. The valve system as set forth in claim 12, wherein: the state of the tractor protection valve is one of unparked and parked.

16. The valve system as set forth in claim 15, wherein: if the state of the tractor protection valve is unparked, the pneumatic fluid at the delivery pressure from the control module pneumatic delivery port being delivered from the tractor protection valve input port to the tractor protection output port; and
if the state of the tractor protection valve is parked, the pneumatic fluid at the delivery pressure from the control module pneumatic delivery port not being delivered from the tractor protection valve input port to the tractor protection output port.

17. The valve system as set forth in claim 12, wherein the control module further includes a relay valve including:
a relay valve input port fluidly communicating with the control module pneumatic supply port for receiving the pneumatic supply pressure of the pneumatic fluid as a relay valve supply pressure of the pneumatic fluid;
a relay valve control port fluidly receiving a relay valve control pressure of the pneumatic fluid based on one of i) the braking demand control signal and the ii) control module supply pressure; and
a relay valve delivery port fluidly delivering a relay valve delivery pressure of the pneumatic fluid, based on the relay valve supply pressure and the relay valve control pressure, as the control module delivery pressure.

18. The valve system as set forth in claim 12, wherein the control module further includes:
a first control valve set to fluidly communicate the braking demand control signal as the relay valve control pressure based on a current braking mode; and
a second control valve set to fluidly communicate the control module supply pressure as the relay valve control pressure based on the current braking mode.

19. The valve system as set forth in claim 18, wherein: the current braking mode is one of an operator controlled braking mode, a system increasing pressure mode, and a system holding pressure mode;
the first control valve is set to fluidly communicate the braking demand control signal as the relay valve control pressure, while the second control valve set to not fluidly communicate the control module supply pressure as the relay valve control pressure, if the current braking mode is the operator initiated braking mode;
the second control valve is set to fluidly communicate the control module supply pressure as the relay valve control pressure, while the first control valve is set to not fluidly communicate the braking demand control signal as the relay valve control pressure, if the current braking mode is the system increasing pressure mode; and
neither the first control valve is set to fluidly communicate the braking demand control signal as the relay valve control pressure nor the second control valve is set to fluidly communicate the control module supply pressure as the relay valve control pressure if the current braking mode is the system holding pressure mode.

20. The valve system as set forth in claim 19, wherein the control module further includes:
a check valve adapted to fluidly communicate the braking demand control signal as the relay valve control pressure during the system holding pressure mode.

21. A method for controlling a pressure of a pneumatic fluid delivered from a tractor protection module, the method comprising:
delivering the pneumatic fluid from an isolation check valve at a supply pressure;
delivering a braking demand control signal of the pneumatic fluid, based on a higher of a first braking demand in a first pneumatic braking circuit and a second braking demand in a second pneumatic braking circuit, from a double-check valve;
receiving the supply pressure as a control module supply pressure of the pneumatic fluid;
receiving a control module control pressure of the pneumatic fluid based on the braking demand control signal;
receiving the supply pressure as a park control module supply pressure of the pneumatic fluid;
receiving a park control module control signal based on a desired park state of an associated tractor;
delivering the park control module supply pressure as a park control module delivery pressure to the tractor protection module based on the park control module control signal;
delivering a control module delivery pressure of the pneumatic fluid based on the control module supply pressure and the control module control pressure; and
delivering the pneumatic fluid from the tractor protection module at the control module delivery pressure based on the park control module delivery pressure, the pneumatic fluid being delivered from the tractor protection module at the control module delivery pressure if the park control module delivery pressure is above a predetermined tractor protection supply pressure.

22. The method for controlling a pressure of a pneumatic fluid delivered from a tractor protection module as set forth in claim 21, further including:
receiving the park control module control signal as an electronic control signal from an associated electronic control unit.

23. The method for controlling a pressure of a pneumatic fluid delivered from a tractor protection module as set forth in claim 21, the step of delivering the pneumatic fluid from the tractor protection module at the control module delivery pressure based on the park control module delivery pressure including:
if the tractor protection module is in an unparked state, delivering the pneumatic fluid at the control module delivery pressure from the tractor protection module.

24. The method for controlling a pressure of a pneumatic fluid delivered from a tractor protection module as set forth in claim 21, further including:
receiving a relay valve supply pressure of the pneumatic fluid based on the control module supply pressure;

receiving a relay valve control pressure of the pneumatic fluid based on one of i) the braking demand control signal and the ii) control module supply pressure; and delivering a relay control pressure of the pneumatic fluid, based on the relay valve supply pressure and the relay valve control pressure, as the control module delivery pressure.

25. The method for controlling a pressure of a pneumatic fluid delivered from a tractor protection module as set forth in claim 24, further including:

setting a first control valve to fluidly communicate the braking demand control signal as the relay valve control pressure based on a current braking mode; and setting a second control valve to fluidly communicate the control module supply pressure as the relay valve control pressure based on the current braking mode.

26. The method for controlling a pressure of a pneumatic fluid delivered from a tractor protection module as set forth in claim 25, further including:

setting the current braking mode to one of an operator controlled braking mode, a system increasing pressure mode, and a system holding pressure mode;

setting the first control valve to fluidly communicate the braking demand control signal as the relay valve control pressure, while the second control valve set to not fluidly communicate the control module supply pressure as the relay valve control pressure, if the current braking mode is the operator initiated braking mode;

setting the second control valve to fluidly communicate the control module supply pressure as the relay valve control pressure, while the first control valve is set to not fluidly communicate the braking demand control signal as the relay valve control pressure, if the current braking mode is the system increasing pressure mode; and setting neither the first control valve to fluidly communicate the braking demand control signal as the relay valve control pressure nor the second control valve to fluidly communicate the control module supply pressure as the relay valve control pressure if the current braking mode is the system holding pressure mode.

27. The method for controlling a pressure of a pneumatic fluid delivered from a tractor protection module as set forth in claim 26, further including:

fluidly communicating the braking demand control signal via a check valve as the relay valve control pressure during the system holding pressure mode.

28. The method for controlling a pressure of a pneumatic fluid delivered from a tractor protection module as set forth in claim 27, further including:

setting the mode as the system holding pressure mode during a hill start assist event.

29. A valve system, including:

an isolation check valve delivering pneumatic fluid as a supply pressure;

a tractor protection module delivering the pneumatic fluid at a tractor protection delivery pressure based on the supply pressure and a trailer park brake pressure of the pneumatic fluid;

a relay valve adapted to:
receive the supply pressure;
receive a relay valve control pressure of the pneumatic fluid based on one of i) a braking demand control signal and ii) the supply pressure; and
deliver a relay control pressure of the pneumatic fluid, based on the supply pressure and the relay valve control pressure to an input port of the tractor protection module;

a first control valve set to fluidly communicate the braking demand control signal as the relay valve control pressure based on a current braking mode, the current braking mode being one of an operator controlled braking mode, a system increasing pressure mode, and a system holding pressure mode;

a second control valve set to fluidly communicate the supply pressure as the relay valve control pressure based on the current braking mode, wherein:

if the current braking mode is the operator initiated braking mode, the first control valve is set to fluidly communicate the braking demand control signal as the relay valve control pressure, while the second control valve set to not fluidly communicate the control module supply pressure as the relay valve control pressure;

if the current braking mode is the system increasing pressure mode, the first control valve is set to not fluidly communicate the braking demand control signal as the relay valve control pressure, while the second control valve is set to fluidly communicate the control module supply pressure as the relay valve control pressure; and if the current braking mode is the system holding pressure mode, neither the first control valve is set to fluidly communicate the braking demand control signal as the relay valve control pressure nor the second control valve is set to fluidly communicate the control module supply pressure as the relay valve control pressure; and means for controlling the tractor protection delivery pressure.

30. The valve system as set forth in claim 1, wherein:

the control module control pressure is a higher pressure of two braking demand control signals.

* * * * *